United States Patent [19]

Aramaki et al.

[11] Patent Number: 4,543,242

[45] Date of Patent: Sep. 24, 1985

[54] PROCESS OF PREPARING NITROGEN TRIFLUORIDE BY GAS-SOLID REACTION

[75] Inventors: Minoru Aramaki; Yoshiyuki Kobayashi; Tamio Nakamura; Hisaji Nakano, all of Ube; Takashi Suenaga, Yamaguchi, all of Japan

[73] Assignee: Central Glass Company, Limited, Ube, Japan

[21] Appl. No.: 651,944

[22] Filed: Sep. 19, 1984

[30] Foreign Application Priority Data

Sep. 27, 1983 [JP] Japan ................................. 58-177016

[51] Int. Cl.$^4$ ............................................. C01B 21/52
[52] U.S. Cl. ................................................... 423/406
[58] Field of Search ........................................ 423/406

[56] References Cited

U.S. PATENT DOCUMENTS 3,304,248  2/1967  Fullam et al. .
4,091,081  5/1978  Woytek et al. ...................... 423/406
4,284,617  8/1981  Bowen et al. ....................... 423/406

FOREIGN PATENT DOCUMENTS 625055  8/1961  Canada ................................ 423/406
55-8926  6/1980  Japan .

OTHER PUBLICATIONS

Chemical Abstracts Citation, 93(24) 222648b.
Chemical Abstracts Citation, 89(12) 91827b.
Chemical Abstracts Citation, 88(12) 76000n.
Chemical Abstracts Citation, 84(26) 182176b.
Chemical Abstracts Citation, 70(10) 43589m.
Chemical Abstracts Citation, 70(8) 33923b.

Primary Examiner—John Doll
Assistant Examiner—Wayne A. Langel
Attorney, Agent, or Firm—Schwartz, Jeffrey, Schwaab, Mack, Blumenthal & Evans

[57] ABSTRACT $NF_3$ is prepared with good yields by reaction between fluorine gas and an ammonium complex of a metal fluoride, such as $(NH_4)_3AlF_6$, in solid phase. The metal flouride ammonium complex may be one additionally containing an alkali metal, such as $(NH_4)_2NaAlF_6$. The gas-solid reaction is carried out preferably at temperatures above 80° C. and at relatively low partial pressures of fluorine in the gas phase of the reaction system, so that the reaction is easy to control.

8 Claims, No Drawings

PROCESS OF PREPARING NITROGEN TRIFLUORIDE BY GAS-SOLID REACTION

BACKGROUND OF THE INVENTION

This invention relates to a novel process of preparing nitrogen trifluoride by reaction between fluorine gas and an ammonium complex of a metal fluoride.

Nitrogen trifluoride $NF_3$ is a colorless gas under normal conditions and has a boiling point of about $-129°$ C. and a melting point of about $-208°$ C. This compound is useful as a fluorine source material in the preparation of fluoroolefins and also as an oxidizer for a high-energy fuel.

Nitrogen trifluoride is prepared usually by direct fluorination of ammonia in vapor phase or by electrolysis of ammonium hydrogenfluoride. Vapor phase reaction between hydrogen azide and oxygen difluoride is also known. U.S. Pat. No. 3,304,248 proposes to carry out reaction between nitrogen and fluorine by forcing nitrogen gas heated to a temperature above 100° C. to pass through a plasma arc and simultaneously introducing fluorine gas into a post-arc region very close to the anode. The reactions in these methods are vapor phase reactions which are relatively violent and not easy to control. Furthermore, in the popular methods it is necessary to take troublesome measures for the prevention of formation of a flammable or explosive gas atmosphere containing hydrogen.

Japanese Patent Application Publication No. 55-8926(1980) proposes to prepare nitrogen trifluoride by reaction between ammonium hydrogenfluoride in molten state with fluorine gas. However, this method does not seem industrially favorable firstly because the gas-liquid reaction in this method is not so easy to control and causes significant corrosion of the apparatus and also because the yield of nitrogen trifluoride is relatively low.

SUMMARY OF THE INVENTION

It is an object of the present invention to provide a novel process of preparing nitrogen trifluoride easily, safely and economically.

In a process according to the invention, nitrogen trifluoride is formed by reaction between an ammonium complex of a metal fluoride in solid phase and fluorine gas.

More specifically, the ammonium complex used in this invention is either an ammonium fluoride of a metal expressed by the general formula $(NH_4)_xMF_y$, where x is an integer from 1 to 3, y is an integer from 5 to 7, and M represents Fe, Al, Ti, V, Cr, Mn, Ni, Co, Cu, Zr, Nb, W, Si, Ge, Sb, Sn or Pb, or an alkali ammonium fluoride of such a metal M expressed by the general formula $(NH_4)_xMM'F_y$ where M' represents Li, Na or K. An example of the former complex is $(NH_4)_3FeF_6$, and an example of the alkali metal containing complex is $(NH_4)_2NaAlF_6$.

These metal fluoride ammonium complexes are usually in powdery form and readily react with fluorine gas to form nitrogen trifluoride together with hydrogen fluoride and metal fluoride, as represented by the following equation.

$$(NH_4)_3MF_6(s) + 9F_2(g) \rightarrow 3NF_3(g) + 12HF(g) + MF_3(s \text{ or } g) \quad (1)$$

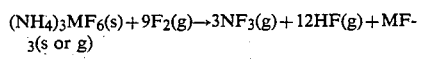

This gas-solid reaction takes place at temperatures over a wide range, so that the reaction in our process may be carried out at room temperature or at moderately elevated temperatures which are below the thermal decomposition temperature of the employed metal fluoride ammonium complex.

For example, thermal decomposition of $(NH_4)_3AlF_6$ proceeds roughly in two stages as represented by the following equations.

$$(NH_4)_3AlF_6(s) \xrightarrow{180-250° C.} NH_4AlF_4(s) + 2NH_4F(g) \quad (2)$$

$$NH_4AlF_4(s) \xrightarrow{250-400° C.} AlF_3(s) + NH_4F(g) \quad (3)$$

Accordingly, the reaction of this complex with fluorine is considered to proceed also in two stages. That is, the first stage of the reaction is to the extent of formation of $NH_4AlF_4$.

$$(NH_4)_3AlF_6(s) + 6F_2(g) \rightarrow 2NF_3(g) + 8HF(g) + NH_4AlF_4(g) \quad (4)$$

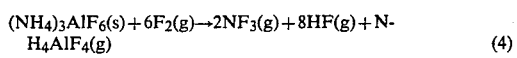

The reaction at this stage starts at temperatures below about 100° C., and the reaction temperature rises as the reaction proceeds to the extent of about 150° C.

At the second stage, ammonium aluminumfluoride reacts with fluorine to turn into aluminum fluoride, as represented by the following equation (5). The reaction at this stage starts at about 150° C., and the reaction temperature rises as the reaction proceeds to the extent of about 250° C.

$$NH_4AlF_4(s) + 3F_2(g) \rightarrow NF_3(g) + 4HF(g) + AlF_3(s) \quad (5)$$

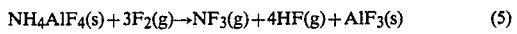

The reactions of equations (4) and (5) are both useful in the present invention.

A metal fluoride ammonium complex used as the starting material in the present invention is a solid and usually powdery material which is very convenient for industrial handling compared with the gaseous or liquid materials used in the known processes such as $NH_3$ gas, $N_2$ gas, $NH_4F$ gas and $NH_4HF_2$ melt. Furthermore, the metal fuloride ammonium complexes are available at relatively low prices.

The gas-solid reaction according to the invention is a mild reaction compared with the conventional vapor phase or gas-liquid reactions. This gas-solid reaction smoothly proceeds even when the concentration of $F_2$ in the gas phase of the reaction system is very low. Therefore, the reaction can be controlled very easily and can be accomplished very safely. As a further advantage of this invention, nitrogen trifluoride is obtained with high yields.

The process of the invention gives a relatively large amount of hydrogen fluoride as a by-product. As is well known, hydrogen fluoride is an industrially valuable material and can be used for the preparation of a metal fluoride ammonium complex as the starting material in the present invention and also for the preparation of fluorine gas by electrolysis. A metal fluoride (which may be an intermediate complex comprising ammonium group) is obtained as an additional by-product. This material is useful for catalysts and also for the preparation of the metal fluoride ammonium complex employed as the starting material. Accordingly the process according to the invention is very favorable from an industrial or economical point of view.

DESCRIPTION OF THE PREFERRED EMBODIMENTS

As to the starting material in our process, $(NH_4)_3FeF_6$, $(NH_4)_3AlF_6$, $(NH_4)_2TiF_6$, $(NH_4)_3VF_6$, $(NH_4)_3CrF_6$, $(NH_4)_2MnF_5$, $(NH_4)_2NiF_6$, $(NH_4)_2CoF_6$, $(NH_4)_3CuF_6$, $(NH_4)_2ZrF_6$, $NH_4NbF_6$, $NH_4WF_7$, $(NH_4)_2SiF_6$, $(NH_4)_2SnF_6$, $(NH_4)_2PbF_6$, $(NH_4)_2SbF_5$ and $(NH_4)_2GeF_6$ are named as typical examples of metal fluoride ammonium complexes expressed by $(NH_4)_xMF_y$. Typical examples of the alkali metal (M') containing complexes expressed by $(NH_4)_xMM'F_y$ are $(NH_4)_2NaFeF_6$, $(NH_4)_2NaAlF_6$, $(NH_4)_2KFeF_6$, $(NH_4)_2KAlF_6$, $NH_4NaSiF_6$, and $NH_4KSiF_6$.

It is possible to carry out the gas-solid reaction according to the invention even at room temperature, but in that case it is necessary to maintain the concentration of $F_2$ in the gas phase at a relatively high level. To carry out the reaction with $F_2$ concentration below 10% by volume, the reaction temperature must be above about 80° C. It is favorable to maintain the $F_2$ concentration at such a low level firstly because the reaction proceeds mildly with little possibility of run-away reaction so that the control of the reaction becomes very easy, and also because the by-production of nitrogen fluorides other than $NF_3$ is suppressed. Accordingly it is preferred to carry out the reaction at temperatures not lower than 80° C.

As to fluorine gas, it is optional whether to use a practically pure $F_2$ gas or to dilute $F_2$ gas with an inactive or unreactive gas such as Ar, $N_2$ or air prior to the introduction of the gas into the reactor. In the latter case it is also possible to use the reaction gas produced by reaction between fluorine gas and the metal fluoride ammonium complex as the diluent. In practice, however, there is little need for intentional dilution of fluorine gas because fluorine gas introduced into the reactor is soon diluted with the gaseous reaction products such as $NF_3$ and HF, so that the fluorine concentration in the gas phase of the reaction system lowers to a desirable level, even when pure $F_2$ gas is used, so long as the feed rate of $F_2$ gas is adequate.

The reaction according to the invention can be carried out in a conventional reactor for known solid-gas reactions. The metal fluoride ammonium complex employed as the starting material is charged into the reactor either batchwise or continuously. Also, the feed of fluorine gas and the discharge of the reaction gas may be either continuous or intermittent. The metal fluoride ammonium complex is subjected to the reaction in a suitably divided form such as powder or granules, but there is no strict limitations on the particle or granule size.

For example, a batch of a powder of the selected metal fluoride ammonium complex is charged into a reactor of the compartment tray or plate tower type and preliminarily heated to a suitable temperature above 80° C. After that fluorine gas is continuously introduced into the reactor at a rate suitable for a desirably low concentration of $F_2$ in the gas phase of the reaction system. As mentioned hreinbefore, the temperature of the reaction system rises as the reaction proceeds. In principle the rate of the reaction according to the invention is very high so that the reaction time can be made very short. In practice it is favorable to carry out a mild and slow reaction by maintaining the $F_2$ concentration in the gas phase at a sufficiently low level for the reasons described hereinbefore. Even under such reaction conditions, the reaction can be completed usually in 30–60 min.

The gaseous product of the rection is a mixture of $NF_3$, HF and possibly some nitrogen fluorides other than $NF_3$. A large portion of HF contained in the reaction gas can be removed by a physical separation means such as a cold trap maintained at a temperature below the boiling point of HF. After that, almost complete removal of HF can be accomplished by treating the reaction gas with NaF. Then the reaction gas is liquefied by cooling with liquid air, liquid nitrogen or liquid argon, and the remaining impurities such as nitrogen fluorides other than $NF_3$ are sucked out of the liquefied product by using a vacuum pump. If desired, the purity of the obtained nitrogen trifluoride can further be enhanced by treatment with KOH and/or by a molecular sieve treatment.

The invention will further be illustrated by the following nonlimitative examples.

EXAMPLE 1

A reactor of the forced circulation compartment tray type (two-stage) was used. The reactor was made of nickel and had an inner diameter of 300 mm and a length of 700 mm. Initially, 3000 g of $(NH_4)_3AlF_6$ powder was charged into the reactor and heated in $N_2$ gas atmosphere up to 110° C. by means of an external heater. After that practically pure $F_2$ gas was continuously introduced into the reactor at such a rate that 3508 g (2.068 Nm$^3$) of $F_2$ was introduced in 10 hr.

The reaction gas discharged from the reactor was passed through a cold trap and then treated with NaF for the purpose of almost completely removing HF gas. The thus treated reaction gas was liquefied by cooling with liquid nitrogen, and the pressure was reduced by operating a vacuum pump to suck out unwanted substances other than $NF_3$.

The product obtained by the above process was 1660 g (0.524 Nm$^3$) of nitrogen trifluoride which had a purity of 98.5%. At the end of the 10 hr reaction, the temperature of the solid material in the reactor was 150° C. The solid material remained in the reactor weighed 1860 g and was confirmed to be $NH_4AlF_4$ by X-ray diffraction analysis. The yield of nitrogen trifluoride on the basis of fluorine:

$$\frac{1660 \text{ g (nitrogen trifluoride)}}{0.623 \times 3508 \text{ g (fluorine)}} \times 100\% \approx 76\%$$

EXAMPLE 2

In the reactor used in Example 1, 1680 g of $NH_4AlF_4$ formed by the reaction of Example 1 was heated to 160° C. in $N_2$ gas atmosphere. After that fluorine gas was continuously introduced into the reactor at such a rate that 1752 g (1.032 Nm$^3$) of $F_2$ was introduced in 5 hr. The reaction gas was treated in the same manner as in Example 1.

The product of this process was 709 g (0.214 Nm$^3$) of nitrogen trifluoride of 98.1% purity. At the end of the 5 hr reaction, the temperature of the solid material in the reactor was 250° C. The solid material remained in the reactor weighed 1290 g and was confirmed to be $AlF_3$ by X-ray diffraction analysis. The yield of nitrogen trifluoride on the basis of fluorine was about 65%.

EXAMPLE 3

In the reactor mentioned in Example 1, 3000 g of $(NH_4)_2NaAlF_6$ powder was heated in $N_2$ gas atmosphere up to 110° C. by means of an external heater. After that $F_2$ gas was continuously introduced into the reactor at such a rate that 3400 g (2.016 $Nm^3$) of $F_2$ was introduced in 10 hr. The reaction gas was treated in the same manner as in Example 1.

The product of this process was 1434 g (0.484 $Nm^3$) of nitrogen trifluoride of 98.8% purity. At the end of the 10 hr reaction, the temperature of the solid material in the reactor was 150° C. The solid material remained in the reactor weighed 1890 g and was confirmed to be $NaAlF_4$ by X-ray diffraction analysis. The yield of nitrogen trifluoride on the basis of fluorine was about 72%.

EXAMPLE 4

In the reactor mentioned in Example 1, 3000 g of $(NH_4)_3FeF_6$ powder was heated in $N_2$ gas atmosphere up to 110° C. by means of an external heater. After that $F_2$ gas was continuously introduced into the reactor at such a rate that 4584 g (2.702 $Nm^3$) of $F_2$ was introduced in 15 hr. The reaction gas was treated in the same manner as in Example 1.

The product of this process was 2141 g (0.675 $Nm^3$) of nitrogen trifluoride of 99.0% purity. At the end of the 15 hr reaction the temperature of the solid material in the reactor was 250° C. The solid material remained in the reactor weighed 1512 g and was confirmed to be $FeF_3$ by X-ray analysis. The yield of nitrogen trifluoride on the basis of fluorine was about 75%.

EXAMPLE 5

In the reactor mentioned in Example 1, 3000 g of $(NH_4)_2SiF_6$ powder was heated in $N_2$ gas atmosphere up to 110° C. by means of an external heater. After that $F_2$ gas was continuously introduced into the reactor at such a rate that 3843 g (2.265 $Nm^3$) of $F_2$ was introduced in 15 hr. The reaction gas was treated in the sme manner as in Example 1. In the reaction gas before the treatment the presence of HF and $SiF_4$ was confirmed. At the last stage of the 15 hr reaction the temperature of the reaction system was 160° C.

The product of this process was 1627 g (0.513 $Nm^3$) of nitrogen trifluoide of 97.8% purity. After the reaction no solid material remained in the reactor. The yield of nitrogen trifluoride on the basis of fluorine was about 68%.

What is claimed is:

1. A process of preparing nitrogen trifluoride comprising the step of reacting an ammonium complex of a metal fluoride corresponding to the general formula $(NH_4)_xMF_y$, where x is an integer from 1 to 3, y is an integer from 5 to 7, and M represents Fe, Al, Ti, V, Cr, Mn, Ni, Co, Cu, Zr, Nb, W, Si, Ge, Sb, Sn or Pb in solid phase with fluorine gas.

2. A process according to claim 1, wherein the reaction between the ammonium complex of a metal fluoride and fluorine gas is carried out at temperatures in the range from about 80° C. to the thermal decomposition temperature of the ammonium complex of a metal fluoride.

3. A process according to claim 2, wherein the concentration of $F_2$ in the gas phase of the reaction system is kept below 10% by volume.

4. A process according to claim 1, wherein the ammonium complex of a metal fluoride is selected from the group consisting of $(NH_4)_3FeF_6$, $(NH_4)_3AlF_6$, $(NH_4)_2TiF_6$, $(NH_4)_3VF_6$, $(NH_4)_3CrF_6$, $(NH_4)_2MnF_5$, $(NH_4)_2NiF_6$, $(NH_4)_2CoF_6$, $(NH_4)_3CuF_6$, $(NH_4)_2ZrF_6$, $NH_4NbF_6$, $NH_4WF_7$, $(NH_4)_2SiF_6$, $(NH_4)_2SnF_6$, $(NH_4)_2SbF_5$, $(NH_4)_2GeF_6$ and $(NH_4)_2PbF_6$.

5. A process or preparing nitrogen trifluoride comprising the step of reacting an ammonium complex of a metal fluoride corresponding to the formula $(NH_4)_xMM'F_y$ where x is an integer from 1 to 3, y is an integer from 5 to 7, M represents Fe, Al, Ti, V, Cr, Mn, Ni, Co, Cu, Zr, Nb, W, Si, Ge, Sb, Sn, or Pb, and M' represents Li, Na or K in solid phase with fluorine gas.

6. A process according to claim 5, wherein the reaction between the ammonium complex of a metal fluoride and fluorine gas is carried out at temperatures in the range from about 80° C. to the thermal decomposition temperature of the ammonium complex of a metal fluoride.

7. A process according to claim 6, wherein the concentration of $F_2$ in the gas phase of the reaction system is kept below 10% by volume.

8. A process according to claim 5, wherein the ammonium complex of a metal fluoride is selected from the group consisting of $(NH_4)_2NaFeF_6$, $(NH_4)_2NaAlF_6$, $(NH_4)_2KFeF_6$, $(NH_4)_2KAlF_6$, $NH_4NaSiF_6$ and $NH_4KSiF_6$.

* * * * *